April 6, 1965  F. O. SKIDMORE  3,177,039
COMBINATION OF PNEUMATIC TIRE, RIM, WHEEL
AND BALANCING WEIGHTS
Filed Dec. 6, 1963  2 Sheets-Sheet 1
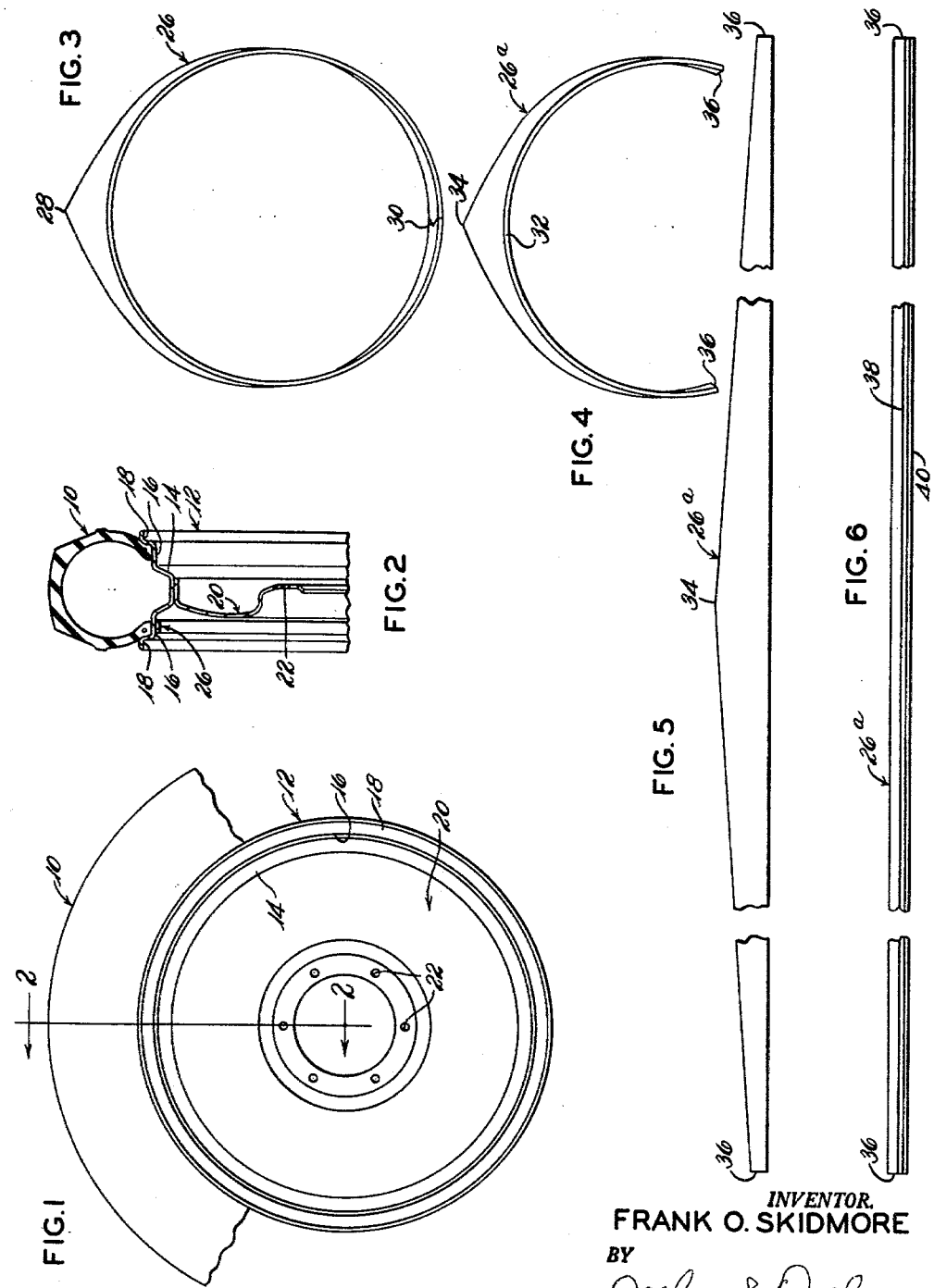
INVENTOR.
FRANK O. SKIDMORE
BY
Oldham & Oldham
ATTYS.

April 6, 1965 F. O. SKIDMORE 3,177,039
COMBINATION OF PNEUMATIC TIRE, RIM, WHEEL
AND BALANCING WEIGHTS
Filed Dec. 6, 1963 2 Sheets-Sheet 2

INVENTOR.
FRANK O. SKIDMORE
BY *Oldham & Oldham*
ATTYS.

United States Patent Office 3,177,039
Patented Apr. 6, 1965

3,177,039
COMBINATION OF PNEUMATIC TIRE, RIM, WHEEL AND BALANCING WEIGHTS
Frank O. Skidmore, Cuyahoga Falls, Ohio, assignor to Three G Corporation, Akron, Ohio, a corporation of Ohio
Filed Dec. 6, 1963, Ser. No. 329,616
5 Claims. (Cl. 301—5)

This invention relates to a vehicle wheel which includes a rim, with or without a tire, and balancing weights adhered to the rim to effectively statically and dynamically balance the wheel. It includes the method of determining proper balance and adhering the weights to the rim. This application is a continuation-in-part of my application Serial No. 206,264 filed June 29, 1962, now abandoned.

In the manufacture of pneumatic tires, it is extremely difficult to produce a perfectly balanced tire, although present practice is approaching this end. Also, wheels and drop center rims manufactured within limited tolerances may be slightly out of balance so that both before and after the pneumatic tire is mounted upon the rim, the assembly is out of balance.

It has been the usual practice to balance tire, wheel, and rim assemblies by placing them on a balancing machine having a tiltable vertical spindle on which the wheel is mounted, and then positioning a weight or weights in turn on the light side (as indicated by bubble) of the tire near the rim until a single weight or a plurality of weights have been positioned to bring the assembly into substantial balance. Then the weight or weights are attached to the tire retaining flange by clipping them thereto.

The standard method for balancing a tire, wheel and rim assembly, as described, is open to the objection that it leaves an unsightly lump of lead, or a plurality of lumps on the side flange of the tire-rim. Additionally, the weights in this position are easily knocked off of the rim by the engagement of the tire and rim with a curb. Furthermore, the weights are often concentrated in a single lump, are axially to one side of the center of the wheel bearings tending to cause them to fly off due to centrifugal force.

It is the general object of the present invention to avoid and overcome the foregoing and other difficulties of and objections to prior art practices by the provision of an improved, inexpensive, relatively simple, easily applied balancing means.

Another object of the invention is to provide balancing means for such assemblies wherein the balancing means are attached to the rim toward its center substantially out of sight, and in a position where they cannot be knocked off by a curb, for example.

A further object of the invention is to provide relatively elongate, relatively thin wheel balance means that can be manually molded or shaped to circumferentially conform to and fit on a given wheel or rim surface.

Another object of the invention is the provision of balancing means of the type described wherein the balancing means is distributed circumferentially of the rim to give a more circumferentially uniform balance to the assembly.

Another object of the invention is to provide wheel balancing means wherein centrifugal force on the balancing means does not tend to tear them off but acts to hold the balancing means more securely in position.

Another object of the invention is to provide a set of magnetic test balance weights to quickly and easily determine the proper weight and position to balance a tire wheel and rim combination.

Another object of the invention is to provide balancing means which is spread out rather than concentrated so the means may be readily and positively adhered in position as by pressure-sensitive adhesive means.

According to the invention, the balance weight or weights are adhered to the inner surface of the rim of the wheel of an automobile or other vehicle by a pressure-sensitive adhesive. The rim is adapted to receive a pneumatic tire or may have such a tire mounted upon it. The rim may or may not be a component part of the wheel. The weight is not applied at the flange of the rim where a clipped weight is necessarily attached, but on a radially inner surface of the rim where centrifugal force maintains the weight in contact with the rim and never loosens it. The weight is usually between about ¼ and 1 inch wide and ⅟₁₆ to ½ inch thick, of substantially uniform cross section and having a weight to surface area ratio so that the pressure-sensitive adhesive in combination with the centrifugal force will hold the weight in position. The weight will usually be at least 5 times as long as it is wide, and may conveniently be sold in straight strips about 12 to 18 inches long, or thereabout. If coiled it may be marketed as a much longer strip.

The weight or weights are sufficiently plastic so that they can be shipped as straight strips or in a coil, and then bent manually to the shape required to fit the rim in question. They are usually made of lead or a lead composition. They may be rectangular in cross section with the adhesive on one of the two wider faces. The corners of the flat surface to which the adhesive is attached are preferably beveled. Alternately, the attaching surface may be rounded or of any desired shape in order to adhere to particular radially inner surface of the rim. The adhesive is covered with paper, transparent film or other strippable covering for protection, as is customary with objects coated with such pressure-sensitive adhesive. Each strip is a number of inches long, and is preferably marked or partially severed at equally spaced intervals representing certain increments of weight, so that one, two, or more such sections can easily be sheared or otherwise separated from the strip, as required to effect the balancing action.

For a better understanding of the invention, reference should be had to the accompanying drawings wherein:

FIGURE 1 is a side elevation, partially being broken away, illustrating a tire, rim, wheel and weight assembly incorporating the principles of the invention;

FIGURE 2 is a fragmentary radial cross sectional view taken substantially on line 2—2 of FIGURE 1;

FIGURE 3 is a view in perspective of tire balancing means constructed in accordance with one embodiment of the invention;

FIGURE 4 is a view similar to FIGURE 3 but illustrating balancing means of a second form of the invention;

FIGURE 5 is a plan view, partially broken away, of a weight means, such as those shown in FIGURE 4, but laid out flat;

FIGURE 6 is a side elevation of the weight means shown in FIGURE 5;

Figure 7:
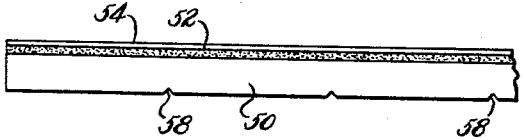
FIG. 7 is a side elevation, partially broken away, of a weight means which is formed to a uniform cross section and which has pressure-sensitive adhesive means and a paper protective layer thereon.

In the drawings, the numeral 10 indicates generally a pneumatic tire, for example, of the endless bead, straight-sided type and mounted upon a drop center rim indicated as a whole by the numeral 12. The rim 12 is normally made in a single endless piece having a central well portion 14, substantially horizontally directed bead receiving flanges 16 extending laterally from the well 14 and integral therewith, the flanges 16 terminating in bead retaining flanges 18, extending substantially vertically, i.e. radially, and being formed integrally with the bead receiving flanges 16.

The drop center rim 12 is normally attached, as by welding or riveting means (not shown) to a stamped metal wheel 20 having bolt receiving holes 22 by which the wheel 20 is mounted upon a wheel hub (not shown). The outer periphery of the wheel 20 is normally flanged and secured to the bottom of the well 14 of the rim 12, as best seen in FIGURE 2.

In order to balance the assembly of the tire 10, rim 12, and wheel 20, a weight or weights indicated as a whole by the numeral 26 are secured to a radially inner surface of the tire bead receiving flange 16, usually on the outboard side of the wheel 20. Placing the weight means 26 on the inboard bead receiving flange 16 completely hides the weight means from sight.

The weight means 26 can take several forms. For example, although not the preferred form, FIGURE 3 illustrates weight means 26 in the form of a band having a greatest width at point 28 and tapering from the point 28 to a point 30 having a narrowest width. The band is split at point 30 with one pointed end and one notched end. The one side of the band 26 is straight and this side is usually placed towards the wheel upon installation.

The band 26 is made of a diameter so that it will snugly fit inside of the tire receiving flange 16 and can be pressed axially down underneath the flange 16 so that the compression of the band 26 holds it firmly in position on the rim. In this form of the invention, the band 26 is made of resilient metal, such as galvanized steel sheet. Of course, the band 26 is made in a plurality of weights, that is, with the width at the point 28 of the several bands being of graduated size, and a proper band is selected so that when the point 28 is placed upon the light side of the tire, rim and wheel assembly on the balancing machine, the assembly is balanced.

Turning now to the embodiment of the invention shown in FIGURE 4 which again is not a preferred form, the balancing means, indicated by the numeral 26a, is made in the form of a band adapted to extend about 180°, or slightly more, around the rim. One side 32 of the band is made straight, the width of the other side of the band is tapered, having a greatest width at a center point 34 and tapering to a smallest width at end points 36.

The band 26a of FIGURE 4 is normally made from sheet lead material, cut as described, and adapted to be applied by a pressure sensitive adhesive to the inside periphery of the tire receiving flange 16.

FIGURES 5 and 6 illustrate the band 26a laid out flat and having the widest point 34, narrow ends 36, and a straight side 32. FIGURE 6 shows the band 26a in side elevation and having a layer 38 of pressure-sensitive adhesive on one side, the adhesive being normally covered and protected by a removable protective covering 40.

FIGURE 7 illustrates the preferred form of the invention which is an extruded lead or lead composition strip 50 having a pressure-sensitive adhesive layer 52 and a removable protective covering release layer 54. The lead composition strip 50 is extruded, or otherwise formed to a substantially uniform cross sectional area generally having its width greater than its thickness. In other words, the invention contemplates that the strip 50 may be between, for example, about ¼ and 1 inch in width and between about 1/16 and ½ inch in thickness. In order to achieve the spread area for holding the strip 50 in position by pressure-sensitive adhesive means the invention contemplates that the strip 50 should be made from a lead sheet having a weight to area ratio of between about .44 oz. per square inch to about 3.54 oz. per square inch, and preferably about .88 oz. per square inch for automobile wheels. In a preferred embodiment of the invention the weight would weigh approximately .2 ounce per lineal inch to 1.32 ounces per lineal inch. The strip 50 may be cut to desired lengths in any convenient manner, such as clippers, or by scoring so that it may be bent to be broken off. Such strip 50 will preferably be from about one to sixteen times its thickness in width, and generally is about five times as long as it is wide.

Figure 10:
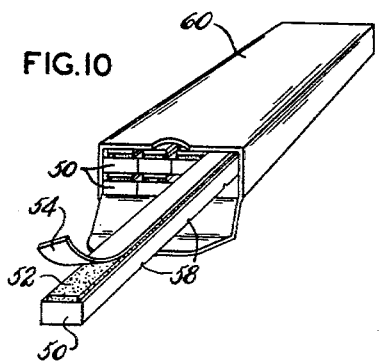
FIGURE 10 is a view in perspective of an open package of a plurality of weights with one weight partially removed and the strippable covering partially removed from this weight.
Figure 11:
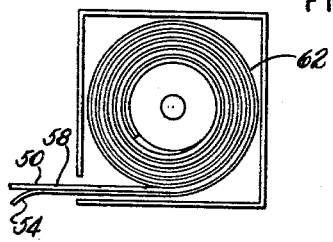
FIGURE 11 is a side view of a coil of weight material with the coil graduated into equal weight segments and with the strippable material partially removed from the end of the coil.

The strip 50 may be marketed as a package of parallel strips, all of substantially the same length, as shown in FIGURE 10, or as a coil, as shown in FIGURE 11.

It is to be understood that although single weight means are indicated in FIGURE 2, a plurality of weights may be used spaced from one another. The invention includes all different positioning of the weight or weights, provided the weight is adhered by a pressure-sensitive adhesive to a radially inward surface of the rim.

The invention contemplates that the strip 50 may be shaped by finger pressure to fit any contour. Further, the top corners of the strip away from the pressure-sensitive adhesive layer might be beveled so that the strip can fit against a curved or angled surface.

A pressure-sensitive adhesive layer 52 preferably does not cover the whole surface, although it may. As shown in FIGURE 10, there is a narrow margin at each side of the top of the strip which is not covered with adhesive 52. When pressed against a flat rim surface, as in FIGURE 2, the adhesive may spread to cover the whole surface of the strip. If placed over a groove, adhesive may be forced into the groove, although it need not fill it.

Each strip may be divided into equal sections by evenly spaced indentations 58, perhaps one inch long, to represent equal weight increments of perhaps ½ ounce. When a strip is to be applied to a rim it is removed from the container 60 of FIGURE 10, or the coiled roll 62 of FIGURE 11, usually after first balancing the rim, the wheel, or the wheel with the tire mounted on it, on a balancing machine to determine what weight is required. The desired amount of the strip is then cut off with metal cutters or is broken off on the desired indentations 58. The desired strip is then placed into the desired position on the rim and manually bent by finger pressure into proper position. The paper protective layer 54 is then stripped from the adhesive and the lead strip is pressed against the desired inward surface of the rim, sufficient pressure being applied manually or otherwise to complete the shaping of the weight to the rim and to insure adherence to the surface thereof. In this manner the strip 50 may be molded and bent to be positioned over irregular surfaces such as rivet heads or weld spots. Alternatively, the adhesive may be applied to the strip after it is shaped, or it may be applied to the rim before the strip is positioned on it.

The invention contemplates that the strip 50 should be positioned on a surface of the rim or drop center flange which is substantially parallel to the axis of rotation of the wheel and radially inward thereto so that the centrifugal action on the strip 50 during rotational operation of the wheel assembly will tend to more securely hold it in position. Because of the flexibility and/or manual shaping characteristics of the extruded lead strip 50, it means that its positioning at any location is extremely simple. Also, because positioning is not a problem, the lead strip 50 can be placed substantially between the wheel bearings or at least axially inside the outer wheel bearings to eliminate any dynamic out-of-balance such as is caused by conventional balancing weights clipped on the axial outer surfaces of the rim. Many times in conventional balancing weights, the weights must be split with one or more weights placed on the outer rim flange and one or more on the inner rim flange to stabilize the dynamic balance of the assembly. Thus, double positioning of weight is eliminated because the lead strip 50 may be positioned near or between the wheel bearings to at least substantially eliminate any dynamic-out-of-balance condition.

Figure 8:
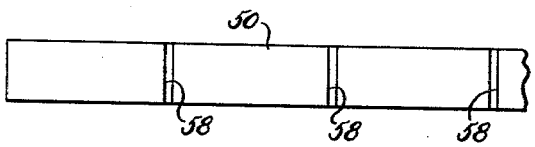
FIGURE 8 is a bottom view of the weight of FIGURE 7.
Figure 9:
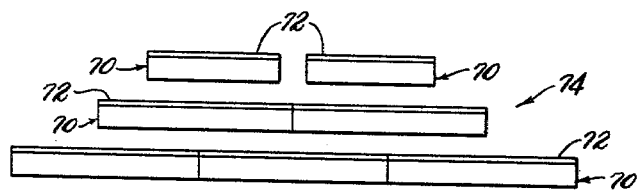
FIGURE 9 is a side elevation of a plurality of magnetic weight means which may be used as a tool to determine the amount and position of unbalance in a tire, rim, and wheel combination.

FIGURE 9 illustrates a plurality of extruded lead composition strips, indicated generally by numeral 70, having flexible and moldable magnetic strips 72 adhesively secured thereto in a conventional manner. The flexible, moldable magnetic strip 58 is of a conventional type on the market such as that sold by Minnesota Mining & Manufacturing Co. The invention contemplates that weights of the type illustrated in FIGURE 8 be made in various lengths and of various weights to form a test balance weight set indicated generally by numeral 74. Preferably, the combined lead strips 70 and magnetic strips 72 of the test set 74 will have the same weight per unit of length as the lead strip 50 of FIGURE 4. This test set of flexible magnetic test balance weights can also be shaped and adjusted by finger pressure to fit any wheel diameter. The flexible magnetic test balance weights are designed to permit the selection of a desired permanent lead composition balance weight without the necessity of attaching and detaching permanent weights of various sizes in the process of selecting the correct weight by the trial and error method. Once the correct weight has been determined by the magnetic test balance weight, a permanent lead strip, such as the strip 50 shown in FIGURE 7, may be cut to length and positioned manually in the desired location on the wheel assembly. Further, the magnetic test balance weight set could also be used to provide efficient test balancing of fly-wheels, drive wheels, etc. on other types of machinery as they are quickly and easily attached because of the magnetic attraction of the flexible, moldable magnetic layer 58 to any ferrous metal.

Thus, to summarize the balancing procedure, the magnetic test weights are sequentially positioned in place by forming them to the radially inner surface of the rim until the correct amount of weight and the proper positioning thereof has been determined by the trial and error method. Then the proper magnetic test weight is removed and a permanent lead strip having the adhesive on one side thereof is cut to the proper length to give the proper balancing weight. The permanent lead strip is then manually formed by finger pressure to the contour of the proper position on the radially inner surface of the rim, the protective release layer is removed, and the strip is manually positioned onto the desired portion of the radially inner surface of the rim and adhered in place by the adhesive.

It is to be particularly understood that one of the primary advantages of the invention is that the weight is spread out to obtain a low weight to surface area ratio so that a greater contact area is provided in order that adhesive may be utilized to position the weight on the wheel assembly. Heretofore, with conventional lumped lead balancing weights, the use of adhesive has not been possible since there was not sufficient area for adherence. Further, the utilization of the centrifugal force acting on the lead weight during rotational operation of the wheel assembly insures that the weight will remain in position even during rough operational use. Thus, an extremely simple, yet highly effective method of attaching balancing weights to wheel assemblies is provided since adhesive or preferably pressure-sensitive adhesive may be utilized. It is further to be understood that another primary advantage of the invention is the flexible and moldable character of the extruded lead composition strip 50 in FIGURE 7 which means that the balancing weight can readily and manually be contoured by finger pressure to any wheel surface to greatly simplify the application of balance weights, and enhance the balancing achieved.

By utilizing the lead balancing strips of long tapered or extruded shape, as illustrated and described above, it is believed that the counter balancing weight is distributed more uniformly around the light area of the assembly to offset the gradually increasing heavy area of the assembly so that the balanced assembly performs more beneficially on the road, than is achieved in utilizing conventional lumped weight balancing techniques. Extensive testing of this weight has been conducted on the wheel assemblies of racing automobiles driven by professional test drivers at Charlotte, North Carolina, and Indianapolis, Indiana, with the balancing weights of the invention providing a far smoother and more efficient balancing action than the conventional lumped balancing weights. The balance of an automobile wheel assembly is a much more involved problem than balance of an airplane propeller because the tread of the tire is contacting the road surface and thus the heavy portion which is generally associated with the tire is moving when that portion contacts the road surface. Further, since this heavy portion is generally spread over a considerable arcuate portion of the tire, the centrifugal force exerted by this heavy portion is directed over a substantial arcuate area. Thus, a lumped balancing weight placed on the rim opposite to the center of gravity of the heavy portion of the tire will provide a static balance on a static balancer, but will not provide proper dynamic balance under road operating conditions because it does not compensate for the arcuate spread of the heavy portion of the tire. A high speeds, a thumping is noted using conventional lumped balancing weights on the rim which is believed due to the unequal distribution of the centrifugal force caused by the difference in the arcuate spread of the heavy side of the tire and the lumped balancing weight, and further due to the movement of the heavy portion of the tire when it contacts the road surface. The testing of the balancing strips of this application on the high speed racing cars described above showed that the thumping at high speeds was eliminated. It was believed that an improved balancing action was resultant because the spread balancing weight more closely simulated the spread heavy portion of the tire.

Other advantages of the balancing weight strips are that it is positioned out of sight underneath the tire receiving flange of the rim where centrifugal action upon the balancing strips tends to force them more tightly into position on the rim, rather than trying to spin them off. The balancing strips cannot be knocked off by scraping a curb with a tire and wheel, and the appearance of the tire, rim, wheel and weight assembly is not marred by exposed clusters of weights. Further, the balancing strips of the invention are more nearly centered between the wheel bearings than conventional weights to eliminate wobble caused by dynamic unbalance. The utilization of the flexible magnetic test weight set in conjunction with the extruded permanent weight strip provides a unique method to quickly and accurately balance any wheel assembly.

While in accordance with the patent statutes at least one best known form of the invention has been illustrated and described in detail, it is to be particularly understood that the invention is not to be limited thereto or thereby, but that the inventive scope is defined in the appended claims.

What is claimed is:

1. The process of balancing an automobile wheel assembly which process comprises,
   sequentially applying a plurality of magnetic test balance weights having a weight of between about .2 ounce per lineal inch and about .88 ounce per lineal inch to a radially inner surface of the assembly until a balance thereof has been achieved to determine the amount of weight and position thereof necessary to effect balance of the assembly, removing the magnetic test balance weights from the assembly, cutting a permanent elongated lead weight strip having a pressure sensitive adhesive on one surface thereof with a protective strippable cover thereover, which weight strip is of substantially the same cross section in weight per lineal inch as the magnetic test balance weights, to essentially the same length as determined by the magnetic test balance weights, manually bending the elongated lead weight strip by placing it against the desired receiving surface on the wheel assembly to form the surface thereof having the pressure sensitive adhesive to the approximate shape of the receiving surface to which the strip is to be attached.

removing the strippable cover from the pressure sensitive adhesive on the elongated lead weight strip, and then pressing the shaped surface of the elongated lead weight strip against the desired surface on the wheel assembly thereby finally shaping the strip and adhering it to the wheel assembly.

2. A method according to claim 1 where the total magnetic test balance weights determining the balance of the assembly are at least five times as long as they are wide.

3. In combination,
an automobile wheel having a rim with a flange,
a pneumatic tire mounted on the rim and retained by the flange, said tire having an extended arcuate heavy area creating a condition of unbalance,
a moldable flexible lead composition strip of substantially uniform cross sectional area throughout its length positioned upon an arcuate contoured radially inward surface of the rim, said strip of lead composition having a weight of between about .2 ounce per lineal inch and about .88 ounce per lineal inch, said strip covering a substantial arcuate portion of the radially inward contoured surface of the rim to uniformly counterbalance the extended arcuate heavy area creating the condition of unbalance in the pneumatic tire, and
adhesive means between the strip and the rim to hold said strip in position on said radially inward contoured surface of said rim when the strip is placed and molded into position.

4. In combination,
a one-piece drop center rim, said rim having a well and substantially horizontal bead receiving flanges extending laterally from the well and integral therewith,
tire bead retaining flanges extending substantially vertically from the edges of the bead receiving flanges and integral therewith,
a wheel secured to the well of the rim,
a pneumatic tire mounted on the rim and secured by the tire bead retaining flanges, said tire having an arcuate spread heavy area causing unbalance to the combintion, and
a wheel balancing weight secured by pressure sensitive adhesive means to the radially inward side of an arcuate surface of the rim which surface is parallel to the axis of rotation of the wheel, and substantially between the bead receiving flanges, said weight having a weight of between about .22 ounce per lineal inch and 1.32 ounces per lineal inch with a width between substantially two and about five times the thickness and a length greater than five times the width, said weight being at the light spot of the tire, rim and wheel assembly extending over a substantial arcuate distance in an amount to substantially counterbalance the extended arcuate heavy area of unbalance in the tire.

5. A combination according to claim 4 where the weight is at least five inches long.

References Cited by the Examiner
UNITED STATES PATENTS

| | | | |
|---|---|---|---|
| 2,292,528 | 8/42 | Kraft | 301—5 |
| 2,336,920 | 12/43 | Beaman | 301—5 |
| 2,640,727 | 6/53 | Kennedy | 301—5 |
| 2,822,290 | 2/58 | Webber | 117—68.5 |
| 2,993,386 | 7/61 | McClendon | 301—5 |
| 3,011,828 | 12/61 | Karig | 301—5 |
| 3,063,619 | 11/62 | Roten. | |
| 3,078,183 | 2/63 | Karalus | 117—122 |
| 3,154,347 | 10/64 | Griffith | 301—5 |

FOREIGN PATENTS 1,109,941 10/55 France.

ARTHUR L. LA POINT, *Primary Examiner.*